(12) United States Patent
Park et al.

(10) Patent No.: US 8,711,123 B2
(45) Date of Patent: Apr. 29, 2014

(54) MULTI-TOUCH RECOGNITION RESISTIVE TOUCH SCREEN FOR RECOGNIZING MULTI-TOUCH COORDINATES THROUGH CAPACITOR CHARGING TIME

(75) Inventors: Kwang Deok Park, Incheon (KR); Sang Bo Cheong, Siheung-si (KR); Jae Hong Joo, Seoul (KR); Min Sung Yang, Seoul (KR); Seong Hyun Nam, Anyang-si (KR); Sang Chuel Lee, Anyang-si (KR)

(73) Assignee: AD Semiconductor Co., Ltd., Seoul (KR)

( * ) Notice: Subject to any disclaimer, the term of this patent is extended or adjusted under 35 U.S.C. 154(b) by 245 days.

(21) Appl. No.: 13/265,364

(22) PCT Filed: Jan. 14, 2010

(86) PCT No.: PCT/KR2010/000219
§ 371 (c)(1),
(2), (4) Date: Dec. 6, 2011

(87) PCT Pub. No.: WO2010/123191
PCT Pub. Date: Oct. 28, 2010

(65) Prior Publication Data
US 2012/0092291 A1    Apr. 19, 2012

(30) Foreign Application Priority Data

Apr. 22, 2009  (KR) .................. 10-2009-0035025

(51) Int. Cl.
G09G 5/00       (2006.01)
G06F 3/033      (2013.01)
G09G 5/08       (2006.01)
G06F 3/041      (2006.01)
G06F 3/045      (2006.01)
G06K 11/06      (2006.01)
G08C 21/00      (2006.01)

(52) U.S. Cl.
USPC ........... 345/174; 345/156; 345/157; 345/173; 178/18.01; 178/18.05; 178/20.01

(58) Field of Classification Search
USPC ................................ 345/156, 157, 173–178; 178/18.01–20.04
See application file for complete search history.

(56) References Cited

U.S. PATENT DOCUMENTS 8,547,114 B2 * 10/2013 Kremin .................. 324/678

* cited by examiner

*Primary Examiner* — Ilana Spar
(74) *Attorney, Agent, or Firm* — Occhiuti & Rohlicek LLP (57) ABSTRACT

The present invention relates to a resistive touchscreen for recognizing touch coordinates through a capacitor charging time constant, and more specifically, the invention comprises: an equal resistance line operating means for obtaining the same resistance line according to an $(R_v+R_{y+})$ value and the same resistance line according to an $(R_v+R_{y-})$ value by using the charge time constant after a charge time constant measuring means measures charge time constants of capacitors $C_{con}L$ and $C_{con}R$; and a coordinate calculating means for obtaining intersecting points of the resistance lines, thereby perceiving the intersecting points as touch positions. According to the present invention, a conventional ADC (analog to digital converter) is not used because the touch positions can be perceived through the capacitor charging time constants, whereby the invention is advantageous for IC integration.

9 Claims, 12 Drawing Sheets

MULTI-TOUCH RECOGNITION RESISTIVE TOUCH SCREEN FOR RECOGNIZING MULTI-TOUCH COORDINATES THROUGH CAPACITOR CHARGING TIME

CROSS REFERENCE TO RELATED APPLICATIONS

This application is a National Stage of International Application No. PCT/KR2010/000219, filed on Jan. 14, 2010, which claims priority to Korean Application No. 10-2009-0035025 filed Apr. 22, 2009. The content of the prior applications are incorporated herein by reference in their entirety.

TECHNICAL FIELD

The present invention relates to a multi-touch recognition resistive touchscreen, and more particularly to a multi-touch recognition resistive touchscreen for recognizing multi-touch coordinates through capacitor charging time.

BACKGROUND ART

Figure 1:
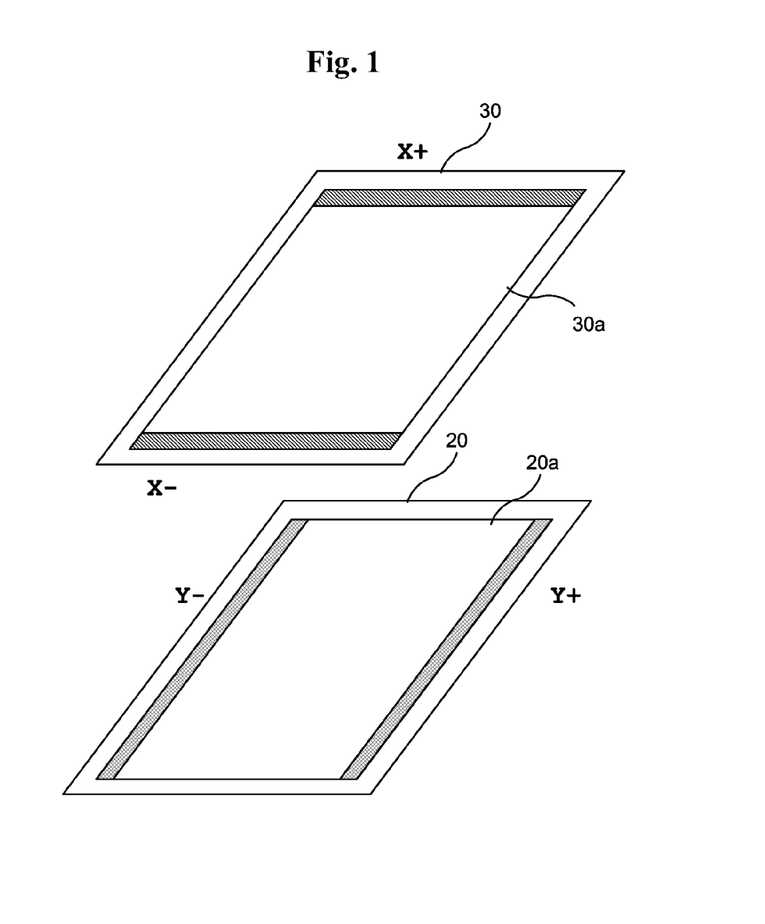
FIG. 1 is a view of a conventional resistive touchscreen.

FIG. 1 is a view of a conventional resistive touchscreen. Specifically, a first transparent film 30 having a first resistive layer 30a formed on a lower surface thereof is separated a predetermined distance from a second transparent film 20 having a second resistive layer 20a formed on an upper surface of the second transparent film 20.

The first resistive layer 30a is provided at opposite ends thereof with an X+ electrode and an X− electrode facing each other, and the second resistive layer 20a is also provided at opposite ends thereof with a Y+ electrode and a Y− electrode facing each other. Here, the X+/X− electrodes are perpendicular to the Y+/Y− electrodes.

When the touchscreen is touched at a certain position thereof, touch pressure forces the first resistive layer 30a and the second resistive layer 20a to contact each other at that position, so that electric current flows between the first resistive layer 30a and the second resistive layer 20a through the contact point. Conventionally, touch coordinates are perceived by reading voltage at a touch point while alternately applying the voltage between the X+ electrode and the Y+ electrode.

Conventional methods require an analog to digital converter (ADC) for reading voltage. Therefore, image conversion and touch resolution vary depending on performance of the ADC. However, the size of the ADC is so large that the touch panel is disadvantageous for IC integration in terms of cost and consumes large amounts of power.

Further, if conventional sheet-shaped resistive layers 20a, 30a are used, multi-touch recognition is impossible. Moreover, since the resistive layers 20a, 30a are wide and have the form of sheet resistance, an error becomes severe with increasing distance from the center of the resistive layers, thereby requiring error correction in order to obtain correct coordinates.

DISCLOSURE

Technical Problem

Therefore, the present invention is directed to providing a multi-touch recognition resistive touchscreen, which allows touch coordinates to be perceived without an ADC and includes resistive layers disposed in the form of a plurality of separate stripes instead of a single sheet, thereby allowing multi-touch recognition and reducing an error in sensing a touch position.

Technical Solution

In accordance with an aspect of the present invention, a multi-touch recognition resistive touchscreen includes: a first resistive layer which includes a plurality of first resistive stripes disposed parallel with one another; a second resistive layer which includes a plurality of second resistive stripes disposed perpendicularly to the first resistive stripes and faces the first resistive layer; a plurality of X+ electrodes each disposed at one end of each of the first resistive stripes; a plurality of X− electrodes each disposed at the other end of each of the first resistive stripes; a plurality of Y+ electrodes each disposed at one end of each of the second resistive stripes; a plurality of Y− electrodes each disposed at the other end of each of the second resistive stripes; a plurality of Y+ stripe selection switches disposed corresponding one to one to the plurality of Y+ electrodes; a plurality of Y− stripe selection switches disposed corresponding one to one to the plurality of Y− electrodes; a Y+ capacitor connected at one end thereof to ground; a Y+ equal resistance line switch disposed between the Y+ capacitor and the Y+ stripe selection switch to determine whether the Y+ capacitor is connected at the other end thereof to the plurality of Y+ stripe selection switches; a Y− capacitor connected at one end thereof to ground; a Y− equal resistance line switch disposed between the Y− capacitor and the Y− stripe selection switch to determine whether the Y− capacitor is connected at the other end thereof to the plurality of Y− stripe selection switches; a Y+ capacitor voltage detection unit which measures voltage applied to the Y+ capacitor in a state in which the first resistive stripe and the second resistive stripe are in contact with each other due to touch, a voltage $V_{DD}$ is applied to the X+ electrode of the first resistive stripe contacting the second resistive stripe, the Y+ stripe selection switch and the Y+ stripe selection switch of the second resistive stripe contacting the first resistive stripe are closed, and the other switches are all opened; a Y− capacitor voltage detection unit which measures voltage applied to the Y+ capacitor in a state in which the first resistive stripe and the second resistive stripe are in contact with each other due to touch, a voltage $V_{DD}$ is applied to the X+ electrode of the first resistive stripe contacting the second resistive stripe, the Y− stripe selection switch and the Y− stripe selection switch of the second resistive stripe contacting the first resistive stripe are closed, and the other switches are all opened; a Y+ capacitor charging time measuring unit which obtains a charge time taken until a charging level given as $V_C/V_{DD}$ reaches a desired level when a voltage measured by the Y+ capacitor voltage detection unit is $V_C$; a Y− capacitor charging time measuring unit which obtains a charge time taken until a charging level given as $V_C/V_{DD}$ reaches a desired level when a voltage measured by the Y− capacitor voltage detection unit is $V_C$; a Y+ equal resistance line operating unit which obtains an equal resistance line based on a value of $(R_V+R_{Y+})$ using $V_C/V_{DD}=1-e^{-t/((R_V+R_{Y+}) \cdot C_{conR})}$, where the contacting first resistive stripe has resistance $R_V$, the contacting second resistive stripe has resistance $R_{Y+}$, and t is charge time of the Y+ capacitor $C_{conR}$ obtained by the Y+ capacitor charging time measuring unit; a Y− equal resistance line operating unit which obtains an equal resistance line based on a value of $(R_V+R_{Y-})$ using $V_C/V_{DD}=1-e^{-t/((R_V+R_{Y-}) \cdot C_{conL})}$, where the contacting first resistive stripe has resistance $R_V$, the contacting second resistive stripe has resistance $R_{Y-}$, and t is charge time of the Y− capacitor $C_{conL}$ obtained by the Y− capacitor charging time measuring unit; and a touch coordinate calculating unit which searches for a point of intersection between the equal resistance line based on the value of $(R_V+R_{Y+})$ and the equal resistance line based on the value of $(R_V+R_{Y-})$.

The multi-touch recognition resistive touchscreen may further include a discharge unit with a discharge switch for discharging the voltage charged in the Y+ and Y− capacitors between the Y+ capacitor voltage detection unit and the Y+ capacitor and between the Y− capacitor voltage detection unit and the Y− capacitor.

In accordance with another aspect of the invention, a multi-touch recognition resistive touchscreen includes: a first resistive layer which includes a plurality of first resistive stripes disposed parallel with one another; a second resistive layer which includes a plurality of second resistive stripes disposed perpendicularly to the first resistive stripes and faces the first resistive layer; a plurality of X+ electrodes each disposed at one end of each of the first resistive stripes; a plurality of X− electrodes each disposed at the other end of each of the first resistive stripes; a plurality of Y+ electrodes each disposed at one end of each of the second resistive stripes; a plurality of Y− electrodes each disposed at the other end of each of the second resistive stripes; a plurality of Y+ stripe selection switches disposed corresponding one to one to the plurality of Y+ electrodes; a plurality of Y− stripe selection switches disposed corresponding one to one to the plurality of Y− electrodes; a common capacitor connected at one end thereof to ground; a Y+ equal resistance line switch disposed between the common capacitor and the Y+ stripe selection switch to determine whether the common capacitor is connected to the plurality of Y+ stripe selection switches; a Y− equal resistance line switch which is disposed between the common capacitor and the Y− stripe selection switch to determine whether the common capacitor is connected to the plurality of Y− stripe selection switches; a common capacitor voltage detection unit which measures voltage applied to the common capacitor in a state in which the first resistive stripe and the second resistive stripe are in contact with each other by touch, a voltage $V_{DD}$ is applied to the X+ electrode of the contacting first resistive stripe, the Y+ stripe selection switch and the Y+ stripe selection switch of the contacting second resistive stripe are closed and the other switches are all opened, and voltage applied to the common capacitor in a state in which the Y− stripe selection switch and the Y− stripe selection switch of the contacting second resistive stripe are closed and the other switches are all opened; a common capacitor charging time measuring unit which obtains a charge time taken until a charging level given as $V_C/V_{DD}$ reaches a desired level when a voltage measured by the common capacitor voltage detection unit is $V_C$; an equal resistance line operating unit which obtains an equal resistance line based on a value of $(R_V+R_{Y+})$ and an equal resistance line based on a value of $(R_V+R_{Y-})$ using $V_C/V_{DD}=1-e^{-t/((R_V+R_{Y+})YC_{conR})}$ and $V_C/V_{DD}=1-e^{-t/((R_V+R_{Y-})\cdot C_{conL})}$, where the contacting first resistive stripe has resistance $R_V$, the contacting second resistive stripe has resistance $R_{Y+}$, the contacting second resistive stripe has resistance $R_{Y-}$ and t is charge time of the common capacitor obtained by the common capacitor charging time measuring unit; and a touch coordinate calculating unit which searches for a point of intersection between the equal resistance line based on the value of $(R_V+R_{Y+})$ and the equal resistance line based on the value of $(R_V+R_{Y-})$.

Each of the Y+ equal resistance line switch and the Y− equal resistance line switch may be provided in plural and alternately operated.

Advantageous Effects

According to exemplary embodiments of the invention, the multi-touch recognition resistive touchscreen is advantageous for IC integration since a touch position is perceived through a capacitor charging time constant, and there is no need for an analog to digital converter (ADC). Here, when a plurality of capacitors is alternately operated or electric charges in the capacitor are forcibly discharged by a discharging device (e.g., refer to FIG. 15), rapid discharging occurs and minimizes delay time according to discharge time, as shown in FIG. 16. Further, in the touchscreen, resistive layers are disposed in the form of a plurality of separate stripes instead of a single sheet, thereby allowing multi-touch recognition while decreasing an error caused by sheet resistance in sensing a touch position.

DESCRIPTION OF DRAWINGS

The above and other aspects, features and advantages of the present invention will be more clearly understood from the following detailed description taken in conjunction with the accompanying drawings, in which.

BEST MODE

Exemplary embodiments of the present invention will now be described in more detail with reference to accompanying drawings. The following embodiments will be provided for understanding of the present invention, and it will be apparent to those skilled in the art that various modifications can be made without departing from the spirit and scope of the invention. Accordingly, the scope of the present invention is not limited to the following exemplary embodiments.

[Inventive Concept]

Figure 2:
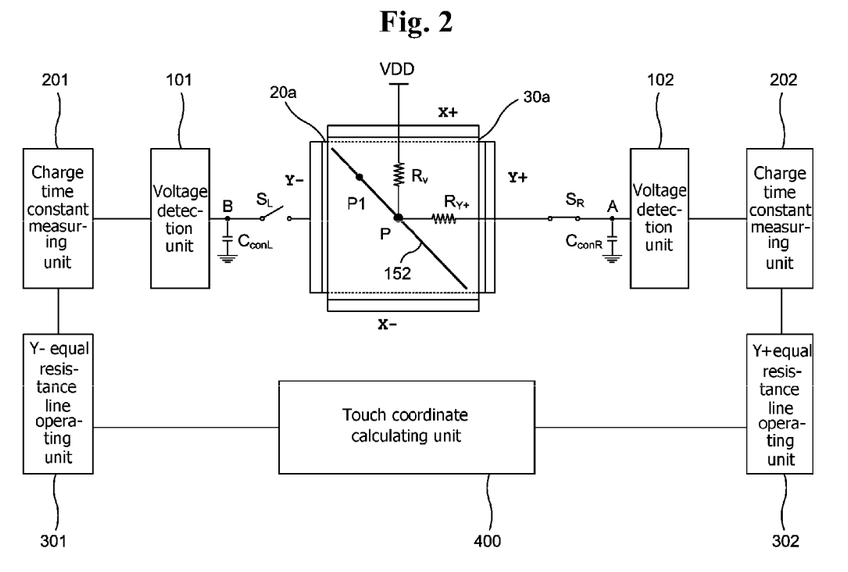
FIGS. 2 to 4 are diagrams explaining a concept of the present invention.
Figure 3:
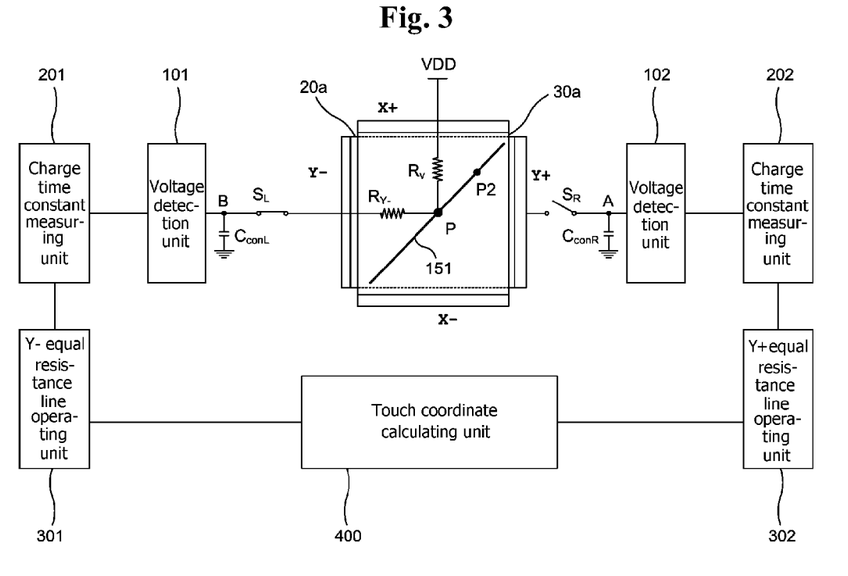
Figure 4:
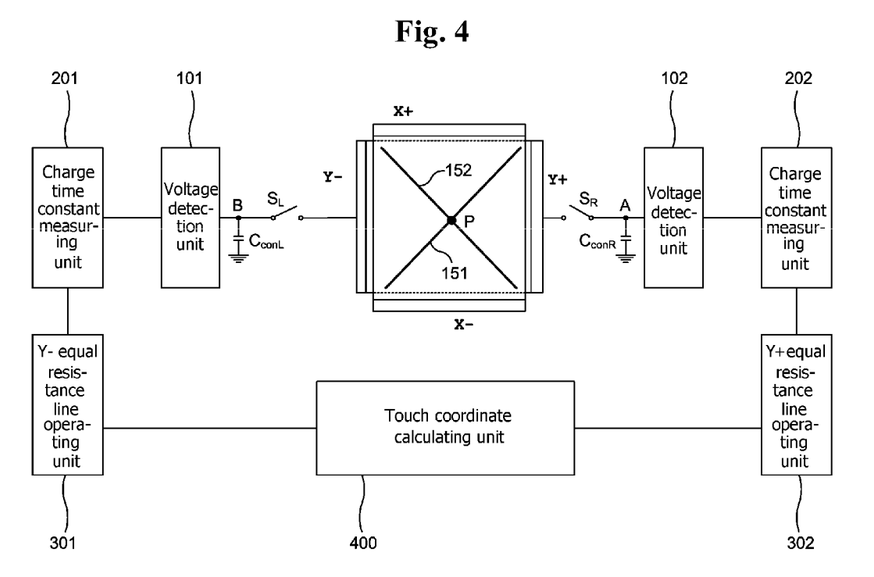
Figure 5:
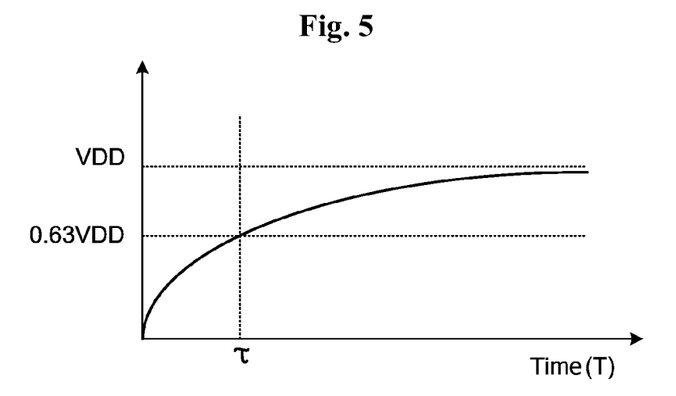
FIG. 5 is a graph of charge voltage V according to charge time T as measured at point A in FIG. 2.

FIGS. 2 to 4 are diagrams explaining a concept of the present invention, and FIG. 5 is a graph of charge voltage V according to charge time T as measured at point A in FIG. 2.

Referring to FIG. 2, as in FIG. 1, X+ and X− electrodes are disposed on a first resistive layer 30a and are parallel with each other, and Y+ and Y− electrodes are disposed on a second resistive layer 20a and are parallel with each other so as to be perpendicular to the X+ and X− electrodes.

A Y+ capacitor $C_{conR}$ is connected at one end thereof to ground and is connected at the other end thereof to the Y+ electrode. A Y+ equal resistance line switch $S_R$ is disposed between the Y+ capacitor $C_{conR}$ and the Y+ electrode. A Y− capacitor $C_{conL}$ is connected at one end thereof to ground and is connected at the other end thereof to the Y− electrode. A Y− equal resistance line switch $S_L$ is disposed between the Y− capacitor $C_{conL}$ and the Y− electrode.

When point P is pressed in a state in which voltage $V_{DD}$ is applied to the X+ electrode, the Y− equal resistance line switch $S_L$ is open and the Y+ equal resistance line switch $S_R$ is closed, the first resistive layer 30a and the second resistive layer 20a are brought into contact with each other at point P so that electric current flows between the first resistive layer 30a and the second resistive layer 20a. Here, the first resistive layer 30a has resistance $R_V$ and the second resistive layer 20a has resistance $R_{Y+}$.

As the voltage $V_{DD}$ is continuously applied, the voltage applied to the Y+ capacitor $C_{conR}$, that is, a charge voltage V according to a charge time T as measured at point A, is obtained as shown in FIG. 5. As the charge time T becomes infinite, the charge voltage V at point A reaches the voltage $V_{DD}$. The charge voltage V according to the charge time T at point A is obtained by a Y+ capacitor voltage detection unit 102.

A Y+ capacitor charging time constant measuring unit 202 obtains a time at which the voltage measured by the Y+ capacitor voltage detection unit 102 reaches $0.632 \times V_{DD}$, that is, a charge time constant τ of the Y+ capacitor $C_{conR}$.

A Y+ equal resistance line operating unit 302 obtains a value of $(R_V+R_{Y+})$ on an assumption that the charge time constant τ of the Y+ capacitor $C_{conR}$ is given as $(R_V+R_{Y+}) \times C_{conR}$. At this time, the values of $(R_V+R_{Y+})$ are distributed along the equal resistance line 152 in the form of a diagonal line. That is, the value of $(R_V+R_{Y+})$ when point P1 is touched is equal to the value of $(R_V+R_{Y+})$ when point P is touched, and thus the equal resistance line 152 based on the value of $(R_V+R_{Y+})$ is not sufficient to perceive a touch position (point P).

Accordingly, besides the equal resistance line 152 based on the value of $(R_V+R_{Y+})$ as shown in FIG. 2, there is a need for obtaining an equal resistance line 151 based on a value of $(R_V+R_{Y-})$, as shown in FIG. 3. Specifically, the Y+ equal resistance line switch $S_R$ is opened and the Y− equal resistance line switch $S_L$ is closed. Then, as described with reference to FIG. 2, voltage applied to the Y− capacitor $C_{conL}$, that is, a charge voltage V according to a charge time T at point B may be obtained by the Y− capacitor voltage detection unit 101, and thus the Y− capacitor charging time constant measuring unit 201 obtains the charge time constant τ of the Y− capacitor $C_{conL}$.

Then, a Y− equal resistance line operating unit 301 obtains a value of $(R_V+R_{Y-})$ on an assumption that the charge time constant τ of the Y− capacitor $C_{conL}$ is given as $(R_V+R_{Y-}) \times C_{conL}$. Here, the equal resistance line 151 based on the value of $(R_V+R_{Y-})$ is not sufficient to determine whether point P2 or point P is touched.

A touch coordinate calculating unit 400 searches for a point of intersection between the equal resistance line 152 based on the value of $(R_V+R_{Y+})$ and the equal resistance line 151 based on the value of $(R_V+R_{Y-})$ and determines correct touch coordinates P.

Let a charge voltage in the Y+ capacitor $C_{conR}$ at an arbitrary charge time t be $V_C$, $V_C/V_{DD}=1-e^{-t/((R_V+R_{Y+})YC_{conR})}$. In the above exemplary embodiment, the charge time when a charging level $V_C/V_{DD}$ is 0.632, i.e. $t=(R_V+R_{Y+}) \times C_{conR}$ has been given as an example, but the invention is not limited thereto. Alternatively, an arbitrary charging level $V_C/V_{DD}$ may be selected by a user.

In this case, the Y+ capacitor charging time constant measuring unit 202 measures time t taken until a desired charging level $V_C/V_{DD}$ is reached based on the charge voltage measured by the Y+ capacitor voltage detection unit 102. Further, the equal resistance line operating unit 302 obtains the value of $R_V+R_{Y-}$ based on the charging level $V_C/V_{DD}$ and the reaching time t.

In the following embodiment, the charge time when the charging level $V_C/V_{DD}$ is 0.632, i.e., the charge time constant τ has been given as an example, but the invention is not limited thereto. The charging level may be arbitrarily selected by a user.

Figure 6:
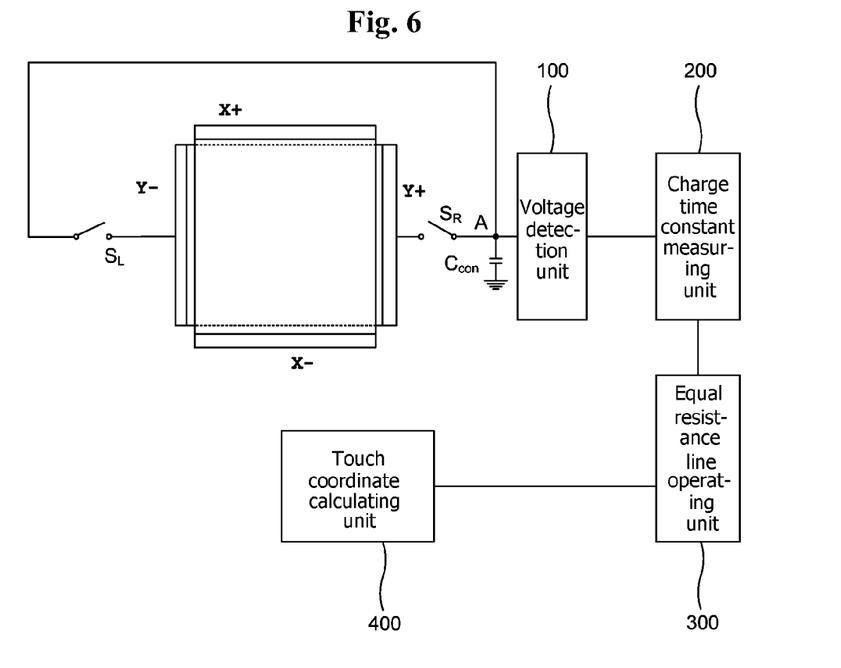
FIG. 6 is a view of an alternative embodiment of FIG. 4.

FIG. 6 is a view of an alternative embodiment of FIG. 4. Unlike the embodiment shown in FIG. 4 where the Y+ capacitor $C_{conR}$ and the Y− capacitor $C_{conL}$ are separately provided, FIG. 6 shows a common capacitor $C_{con}$.

The common capacitor $C_{con}$ is connected at one end thereof to ground and connected at the other end thereof to the Y+ electrode and the Y− electrode. A Y+ equal resistance line switch $S_R$ is disposed between the common capacitor $C_{con}$ and the Y+ electrode. A Y− equal resistance line switch $S_L$ is disposed between the common capacitor $C_{con}$ and the Y− electrode.

In the case where the first resistive layer 20a and the second resistive layer 30a are in contact with each other by touch pressure at point P in a state in which voltage $V_{DD}$ is applied to the X+ electrode, the Y− equal resistance line switch $S_L$ is open and the Y+ equal resistance line switch $S_R$ is closed, voltage is applied to the common capacitor $C_{con}$ at point A when electric current flows between the first resistive layer 20a and the second resistive layer 30a via the contact point, that is, point P, and is measured by a common capacitor voltage detection unit 100. Further, in the case where the first resistive layer 20a and the second resistive layer 30a are in contact with each other by touch pressure at point P in a state in which voltage $V_{DD}$ is applied to the X+ electrode, the Y+ equal resistance line switch $S_R$ is open and the Y− equal resistance line switch $S_L$ is closed, voltage is applied to the common capacitor $C_{con}$ at point A when electric current flows between the first resistive layer 20a and the second resistive layer 30a via the contact point, that is, point P, and is also measured by the common capacitor voltage detection unit 100.

A common capacitor charging time constant measuring unit 200 obtains the charge time constant τ of the common capacitor based on the voltage measured by the common capacitor voltage detection unit 100.

As shown in FIGS. 2 and 3, an equal resistance line operating unit 300 obtains an equal resistance line based on the value of $(R_V+R_{Y+})$ and an equal resistance line based on the value of $(R_V+R_{Y-})$. Further, a touch coordinate calculating unit 400 searches for a point of intersection between the equal resistance line based on the value of $(R_V+R_{Y+})$ and the equal resistance line based on the value of $(R_V+R_{Y-})$ and recognizes the point of intersection as a touch coordinate (i.e. point P).

Figure 7:
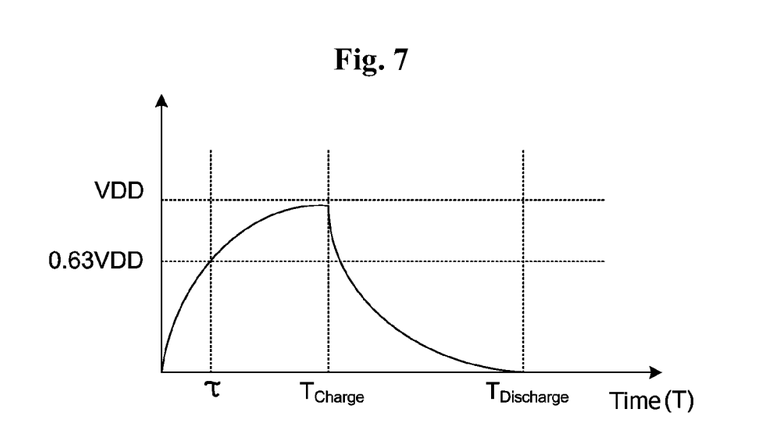
FIG. 7 is a graph of charge-discharge voltage V according to charge-discharge time T as measured at point A in FIG. 2.

FIG. 7 is a graph of charge-discharge voltage V according to charge-discharge time T as measured at point A in FIG. 2. Referring to FIG. 7, it takes a time of $T_{discharge}-T_{charge}$ seconds to charge the Y+ capacitor $C_{conR}$ for $T_{charge}$ seconds and discharging the same. Thus, it takes time to measure the charge time constant τ at every touch.

Figure 8:
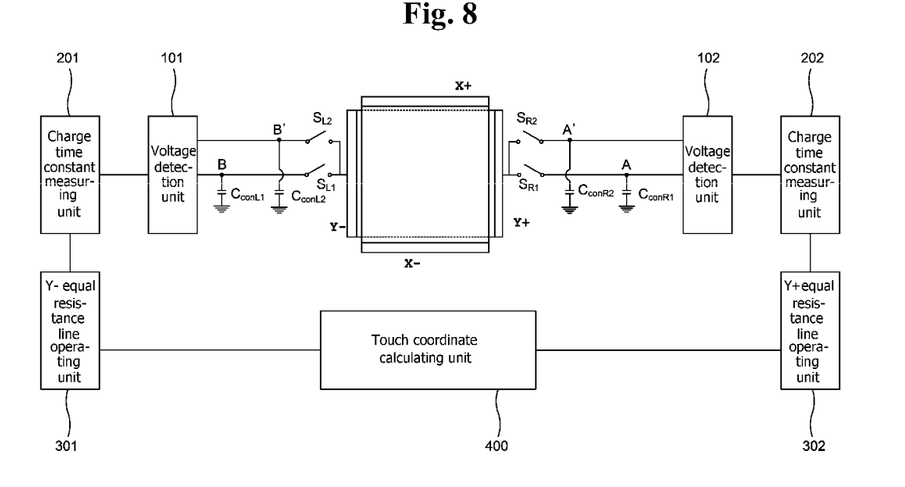
FIG. 8 is a diagram of an alternative embodiment in which a measurement time of a charge time constant τ is reduced as compared with FIG. 4.

FIG. 8 is a diagram of an alternative embodiment in which a measurement time of the charge time constant τ is reduced as compared with FIG. 4. Unlike FIG. 4 where two capacitors $C_{conR}$ and $C_{conL}$ are provided, FIG. 8 shows that four capacitors $C_{conR1}$, $C_{conR2}$, $C_{conL1}$ and $C_{conL2}$ are provided.

Each of two Y+ capacitors $C_{conR1}$ and $C_{conR2}$ is connected at one end thereof to ground and at the other end thereof to the Y+ electrode. Each of two Y+ capacitors $C_{conL1}$ and $C_{conL2}$ is connected at one end thereof to ground and connected at the other end thereof to the Y− electrode.

A Y+ equal resistance line first switch $S_{R1}$ is disposed between the Y+ electrode and the Y+ first capacitor $C_{conR1}$, and a Y+ equal resistance line second switch $S_{R2}$ is disposed between the Y+ electrode and the Y+ second capacitor $C_{conR2}$. A Y− equal resistance line first switch $S_{L1}$ is disposed between the Y− electrode and the Y− first capacitor $C_{conL1}$, and a Y− equal resistance line second switch $S_{L2}$ is disposed between the Y− electrode and the Y− second capacitor $C_{conL2}$.

The Y+ equal resistance line first switch $S_{R1}$ and the Y+ equal resistance line second switch $S_{R2}$ are alternately opened and closed. Also, the Y− equal resistance line first switch $S_{L1}$ and the Y− equal resistance line second switch $S_{L2}$ are alternately opened and closed.

Thus, a Y+ capacitor voltage detection unit 102 alternately reads voltages applied to both ends of the Y+ first capacitor $C_{conR1}$ and the Y+ second capacitor $C_{conR2}$, that is, the voltages at points A and A'. Likewise, a Y− capacitor voltage detection unit 101 alternately reads voltages applied to both ends of the Y− first capacitor $C_{conL1}$ and the Y− second capacitor $C_{conL2}$, that is, the voltages at points B and B'.

As such, since the voltages applied to the capacitors are alternately detected, there is no need to take the discharge time $T_{discharge}$–$T_{charge}$ into account. Accordingly, as compared with FIG. 2, it is possible to obtain a charge time constant τ that is up to two times as fast.

Figure 9:
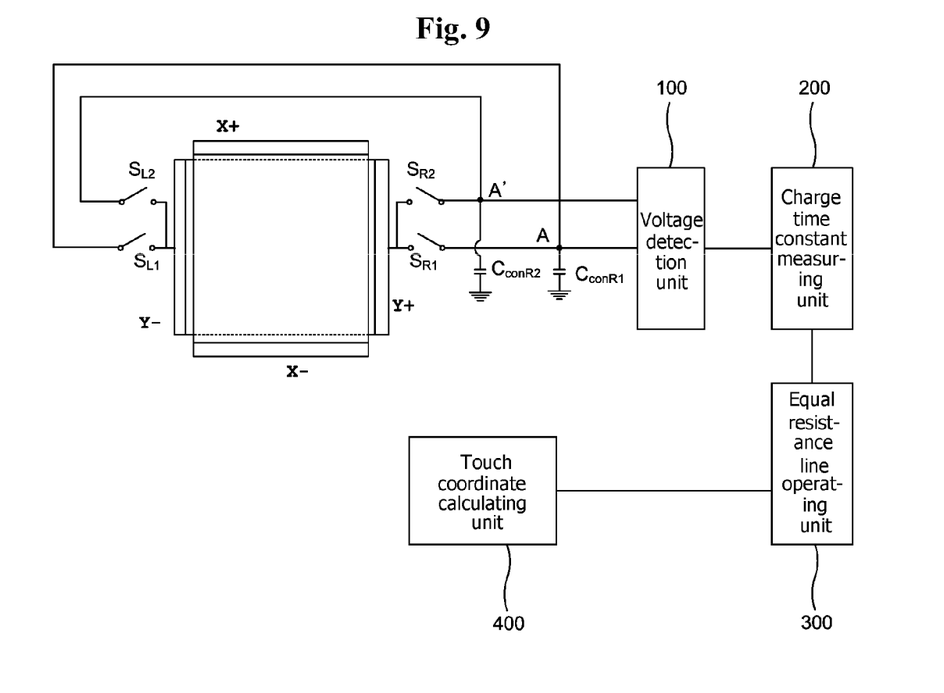
FIG. 9 is a diagram of an alternative embodiment of FIG. 8.

FIG. 9 is a diagram of an alternative embodiment of FIG. 8. Unlike the embodiment shown in FIG. 8, FIG. 9 shows that two common capacitors $C_{con1}$ and $C_{con2}$ are provided in this embodiment.

In this case, each of two common capacitors $C_{con1}$ and $C_{con2}$ is connected at one end thereof to ground, and connected at the other end thereof to the Y+ electrode and the Y1 electrode. A Y+ equal resistance line first switch $S_{R1}$ is disposed between the first common capacitor $C_{con1}$ and the Y+ electrode, and a Y+ equal resistance line second switch $S_{R2}$ is disposed between the second common capacitor $C_{con2}$ and the Y+ electrode. Likewise, a Y− equal resistance line first switch $S_{L1}$ is disposed between the first common capacitor $C_{con1}$ and the Y− electrode, and a Y− equal resistance line second switch $S_{L2}$ is disposed between the second common capacitor $C_{con2}$ and the Y− electrode.

Voltages applied to the two capacitors $C_{con1}$ and $C_{con2}$, that is, voltages corresponding to time applied to points A and A' are measured by a common capacitor voltage detection unit 100.

Figure 10:
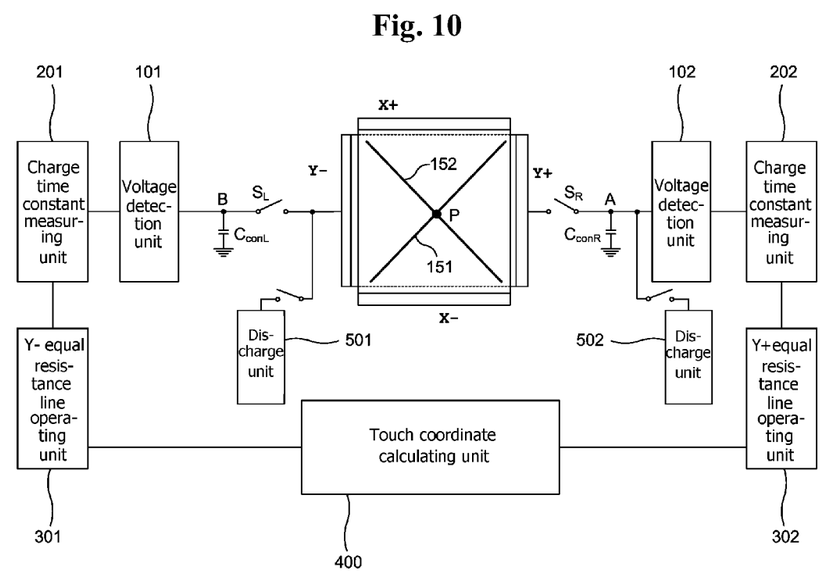
FIG. 10 is a diagram of another alternative embodiment in which a measurement time of a charge time constant r is reduced as compared with FIG. 4.

FIG. 10 is a diagram of another alternative embodiment in which a measurement time of a charge time constant t is reduced as compared with FIG. 4. Unlike the embodiment shown in FIG. 4, two discharge units 501 and 502, and two discharge switches $S_{DR}$ and $S_{DL}$ are provided in this embodiment.

A voltage at point A is read as the Y+ switch $S_R$ is closed. If the Y+ switch is opened and the discharge switch $S_{DR}$ is closed when the voltage at point A reaches $0.632 \times V_{DD}$, discharge immediately occurs at a charge time constant τ of a voltage level of $0.632 \times V_{DD}$, as shown in FIG. 16. Similarly, if the Y− switch is opened and the discharge switch $S_{DL}$ is closed when the voltage charged in the Y− capacitor $C_{conL}$ reaches a desired voltage level, discharge immediately occurs at the charge time constant τ of the voltage level of $0.632 \times V_{DD}$, as shown in FIG. 16. As such, since the voltages applied to the capacitors are immediately discharged, there is no need to consider the discharge time $T_{discharge}$–$T_{charge}$. Accordingly, as compared with the first exemplary embodiment, it is possible to obtain a charge time constant τ that is up to four times as fast.

First Exemplary Embodiment

Figure 11:
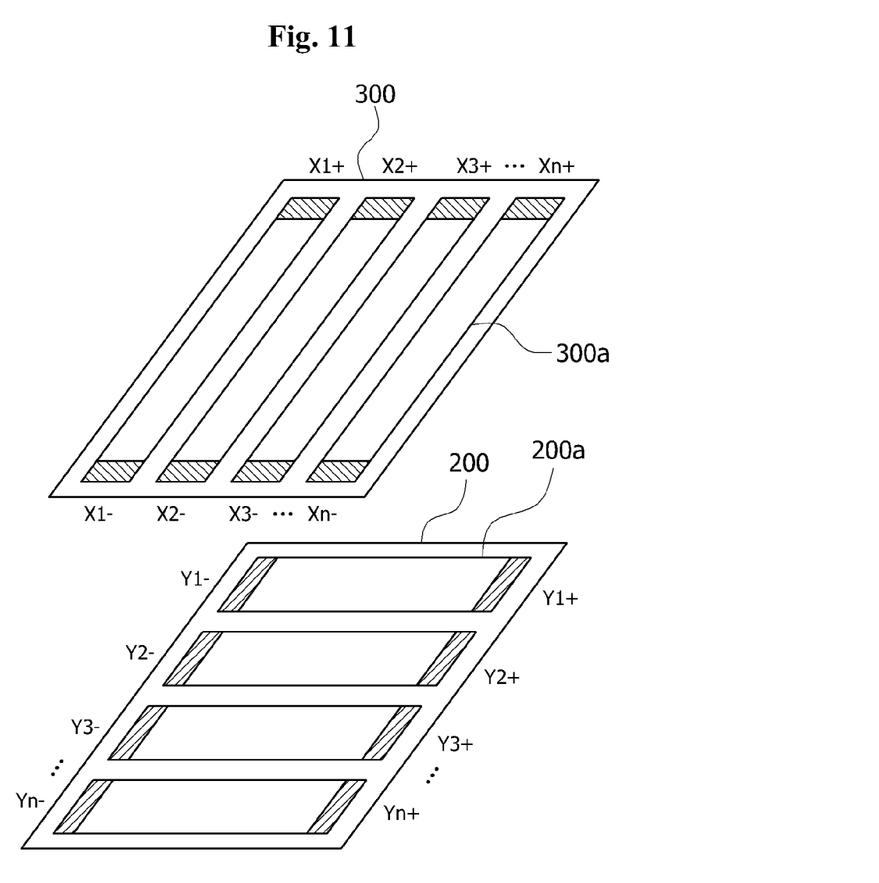
FIG. 11 is a view of a basic structure of a multi-touch recognition resistive touchscreen according to an exemplary embodiment of the present invention.

FIG. 11 is a view of a basic structure of a multi-touch recognition resistive touchscreen according to an exemplary embodiment. Specifically, a first transparent film 300 having a first resistive layer 300a formed on a lower surface thereof is separated a predetermined distance from a second transparent film 200 having a second resistive layer 200a formed on an upper surface of the second transparent film 200. Unlike the structure shown in FIG. 1, for multi-touch recognition, the first resistive layer 300a includes a plurality of first resistive stripes disposed parallel with one another, and the second resistive layer 200a includes a plurality of second resistive stripes disposed perpendicularly intersecting the first resistive stripes.

Further, the plural first resistive stripes are respectively provided at opposite sides thereof with a plurality of X+ electrodes $X_{1+}$~$X_{n+}$ and a plurality of X− electrodes $X_{1-}$~$X_{n-}$. Further, the plural second resistive stripes are respectively provided at opposite sides thereof with a plurality of Y+ electrodes $Y_{1+}$~$Y_{n+}$ and a plurality of Y− electrodes $Y_{1-}$~$Y_{n-}$.

Figure 12:
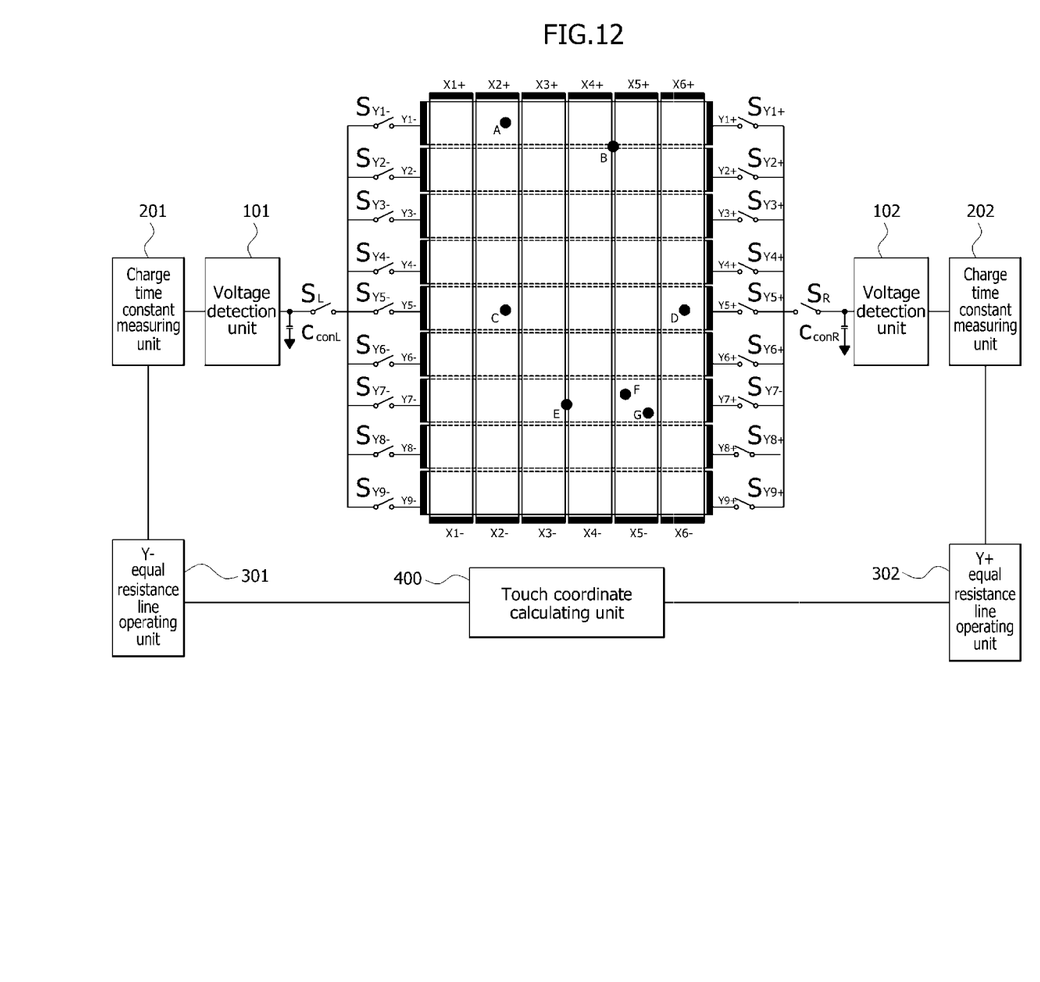
FIG. 12 is a diagram of an operating principle of a multi-touch recognition resistive touchscreen according to a first exemplary embodiment of the present invention.

FIG. 12 is a diagram of an operating principle of a multi-touch recognition resistive touchscreen according to a first exemplary embodiment of the invention. In detail, a plurality of Y+ stripe selection switches $S_{Y1+}$~$S_{Y9+}$ are disposed to correspond to a plurality of Y+ electrodes $Y_{1+}$~$Y_{9+}$, respectively, and a plurality of Y− stripe selection switches $S_{Y1-}$~$S_{Y9-}$ are disposed to correspond to a plurality of Y− electrodes $Y_{1-}$~$Y_{9-}$, respectively.

A Y+ capacitor $C_{conR}$ is connected at one end thereof to ground, and a Y+ equal resistance line switch $S_R$ is disposed between the other end of the Y+ capacitor $C_{conR}$ and the Y+ stripe selection switches $S_{Y1+}$~$S_{Y+}$. A Y− capacitor $C_{conL}$ is connected at one end thereof to ground, and a Y− equal resistance line switch $S_L$ is disposed between the other end of the Y− capacitor $C_{conL}$ and the Y− stripe selection switches $S_{Y1-}$~$S_{Y9-}$.

Coordinates of Point A

Voltage $V_{DD}$ is applied in sequence from an electrode X1+ to an electrode X6−. Touch coordinates of point A are perceived when the voltage VDD is applied to the electrode X2+.

If the stripe selection switch $S_{Y1+}$ and the equal resistance line switch $S_R$ are closed and the other switches are all open, the first resistive layer has resistance $R_V$ and the second resistive layer has resistance $R_{Y+}$. Here, charge voltage V according to charge time T in the Y+ capacitor $C_{conR}$ is obtained by the Y+ capacitor voltage detection unit 102.

The Y+ capacitor charging time constant measuring unit 202 obtains time when the voltage measured by the Y+ capacitor voltage detection unit 102 reaches 0.632×VDD, i.e. a charge time constant τ of the Y+ capacitor $C_{conR}$.

The Y+ equal resistance line operating unit 302 obtains a value of $(R_V+R_{Y+})$ on an assumption that the charge time constant τ of the Y+ capacitor $C_{conR}$ is given as $(R_V+R_{Y+}) \times C_{conR}$.

If the stripe selection switch $S_{Y1-}$ and the equal resistance line switch $S_R$ are closed and the other switches are all open, the first resistive layer has resistance $R_V$ and the second resistive layer has resistance $R_{Y-}$. At this time, the charge voltage V according to the charge time T in the Y– capacitor $C_{conL}$ is obtained by the Y– capacitor voltage detection unit 101. In this manner, the Y– capacitor charging time constant measuring unit 201 obtains the charge time constant τ of the Y– capacitor $C_{conL}$. Then, the Y– equal resistance line operating unit 301 obtains a value of $(R_V+R_{Y-})$ on an assumption that the charge time constant τ of the Y– capacitor $C_{conL}$ is given as $(R_V+R_{Y-})\times C_{conL}$.

Further, the touch coordinate calculating unit 400 searches for a point of intersection between the equal resistance line based on the value of $(R_V+R_{Y+})$ and the equal resistance line based on the value of $(R_V+R_{Y-})$ and perceives correct touch coordinates A.

Coordinates of Point B

First, voltage $V_{DD}$ is applied to an electrode X4+, the stripe selection switch $S_{Y1+}$ and the equal resistance line switch $S_R$ are closed and the other switches are all open. Then, the stripe selection switch $S_{Y1-}$ and the equal resistance line switch $S_R$ are closed and the other switches are all open. In the same manner as coordinate recognition of point A, touch coordinates of point B may be obtained.

Coordinates of Point C

In a particular case of point C, if point C is touched while points A and D are being touched, point C is not sensed by a general matrix method. However, according to the present exemplary embodiment, point C can be independently sensed.

Second Exemplary Embodiment

Figure 13:
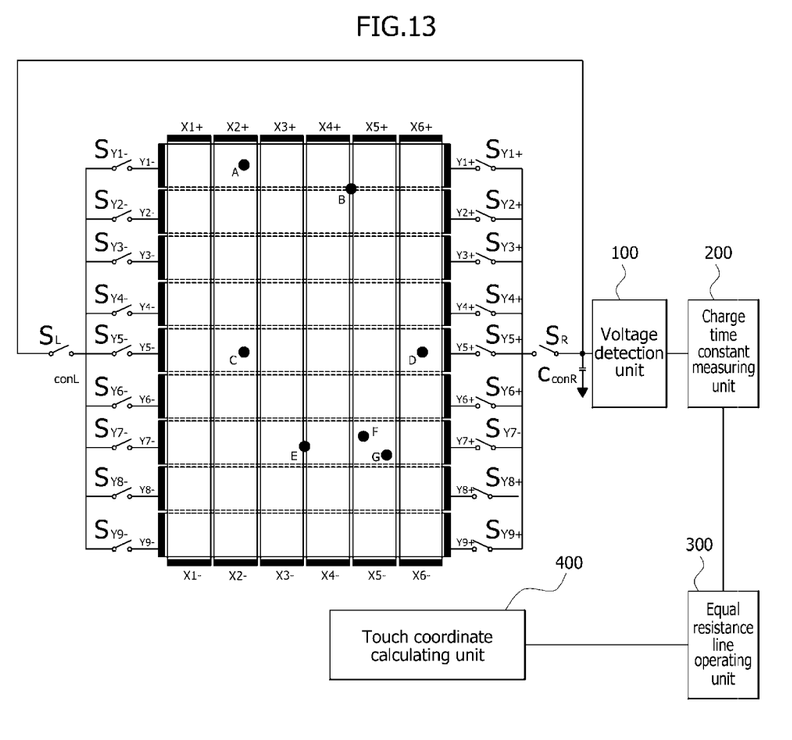
FIG. 13 is a diagram of a multi-touch recognition resistive touchscreen according to a second exemplary embodiment of the present invention.

FIG. 13 is a diagram of a multi-touch recognition resistive touchscreen according to a second exemplary embodiment. Like the embodiment shown in FIG. 6, this exemplary embodiment shows that the common capacitors $C_{con}$ are provided in the Y+ and Y– electrodes.

Third Exemplary Embodiment

Figure 14:
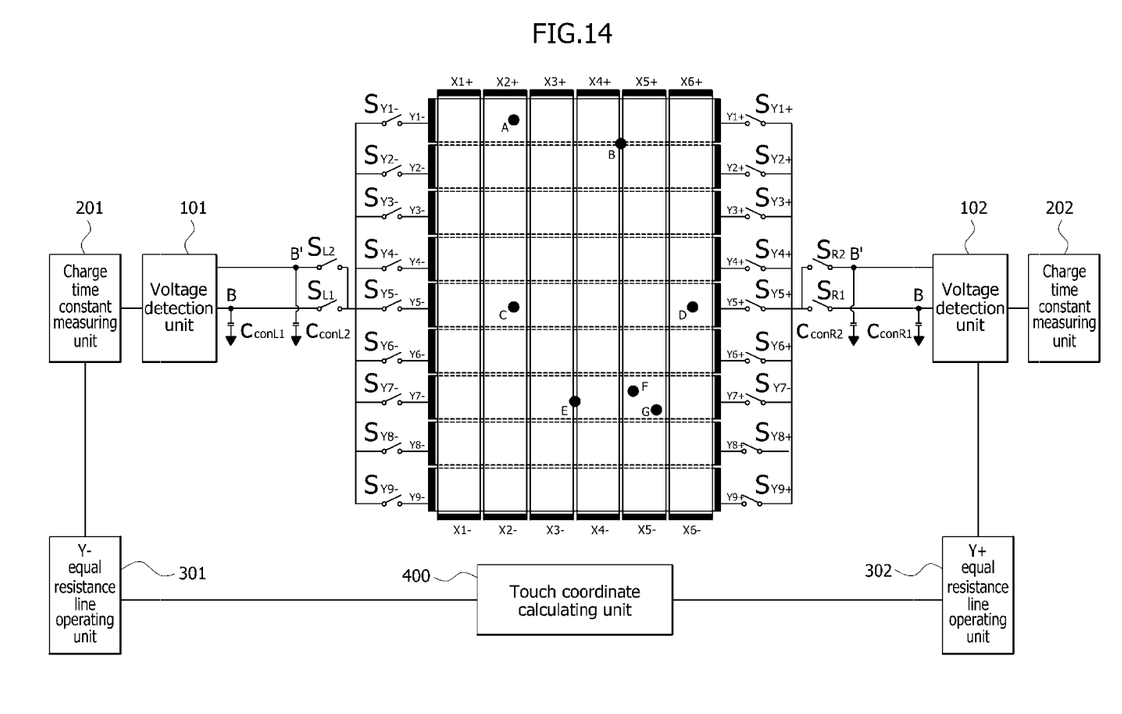
FIG. 14 is a diagram of a multi-touch recognition resistive touchscreen according to a third exemplary embodiment of the present invention.

FIG. 14 is a diagram of a multi-touch recognition resistive touchscreen according to a third exemplary embodiment. As described with reference to FIG. 8, this exemplary embodiment shows that the plurality of Y+ capacitors $C_{conR1}$ and $C_{conR2}$ and Y– capacitors $C_{conL1}$ and $C_{conL2}$ are provided and alternately operated to thereby minimize delay due to the discharge time.

Fourth Exemplary Embodiment

Figure 15:
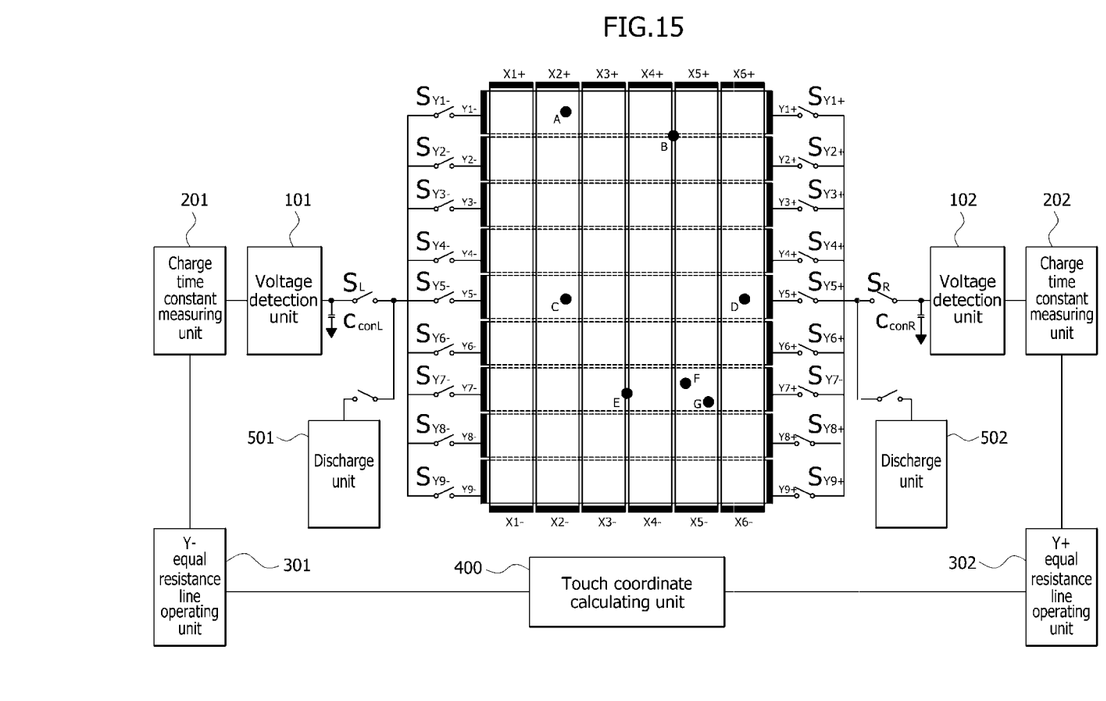
FIG. 15 is a diagram of a multi-touch recognition resistive touchscreen according to a fourth exemplary embodiment of the present invention.
Figure 16:
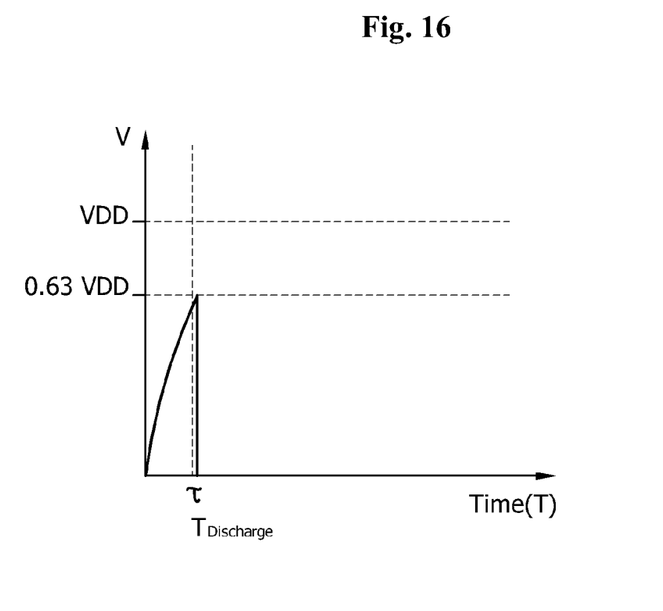
FIG. 16 is a graph of voltage corresponding to forcible discharge applied to some exemplary embodiments of the present invention.

FIG. 15 is a diagram of a multi-touch recognition resistive touchscreen according to a fourth exemplary embodiment. In addition to the first exemplary embodiment, this exemplary embodiment includes two discharge units 501 and 502 and two discharge switches $S_{DR}$ and $S_{DL}$.

A voltage at point A is read as the Y+ switch $S_R$ is closed. If the Y+ switch is open and the discharge switch $S_{DR}$ is closed when the voltage at point A reaches $0.632\times V_{DD}$, discharge immediately occurs. Similarly, if the Y– switch is open and the discharge switch $S_{DL}$ is closed when the voltage charged in the Y– capacitor $C_{conL}$ reaches a desired voltage level, discharge immediately occurs at a charge time constant τ of a voltage level of $0.632\times V_{DD}$, as shown in FIG. 16. As such, since the voltages applied to the capacitors are immediately discharged, there is no need to consider the discharge time $T_{discharge}-T_{charge}$. Accordingly, as compared with the first exemplary embodiment, it is possible to obtain a charge time constant t that is up to four times as fast.

As described above, the multi-touch recognition resistive touchscreens according to the embodiments of the present invention are advantageous for IC integration since a touch position is perceived through a capacitor charging time constant, and there is no need for an analog to digital converter (ADC). Here, when a plurality of capacitors is alternately operated or electric charges in the capacitor are forcibly discharged by a discharging device, rapid discharging occurs and minimizes delay time according to discharge time. Further, in the touchscreen, resistive layers are disposed in the form of a plurality of separate stripes instead of a single sheet, thereby allowing multi-touch recognition while decreasing error caused by sheet resistance in sensing a touch position

The invention claimed is:

1. A multi-touch recognition resistive touchscreen comprising:
   a first resistive layer which comprises a plurality of first resistive stripes disposed parallel with one another;
   a second resistive layer which comprises a plurality of second resistive stripes disposed perpendicularly to the first resistive stripes and faces the first resistive layer;
   a plurality of X+ electrodes each disposed at one end of each of the first resistive stripes;
   a plurality of X– electrodes each disposed at the other end of each of the first resistive stripes;
   a plurality of Y+ electrodes each disposed at one end of each of the second resistive stripes;
   a plurality of Y– electrodes each disposed at the other end of each of the second resistive stripes;
   a plurality of Y+ stripe selection switches disposed corresponding one to one to the plurality of Y+ electrodes;
   a plurality of Y– stripe selection switches disposed corresponding one to one to the plurality of Y– electrodes;
   a Y+ capacitor connected at one end thereof to ground;
   a Y+ equal resistance line switch disposed between the Y+ capacitor and the Y+ stripe selection switch to determine whether the Y+ capacitor is connected at the other end thereof to the plurality of Y+ stripe selection switches;
   a Y– capacitor connected at one end thereof to ground;
   a Y– equal resistance line switch disposed between the Y– capacitor and the Y– stripe selection switch to determine whether the Y– capacitor is connected at the other end thereof to the plurality of Y– stripe selection switches;
   a Y+ capacitor voltage detection unit which measures voltage applied to the Y+ capacitor in a state in which the first resistive stripe and the second resistive stripe are in contact with each other by touch, a voltage $V_{DD}$ is applied to the X+ electrode of the first resistive stripe contacting the second resistive stripe; the Y+ stripe selection switch and the Y+ stripe selection switch of the second resistive stripe contacting the first resistive stripe are closed, and the other switches are all opened;
   a Y– capacitor voltage detection unit which measures voltage applied to the Y+ capacitor in a state in which the first resistive stripe and the second resistive stripe are in contact with each other by touch, a voltage $V_{DD}$ is applied to the X+ electrode of the first resistive stripe contacting the second resistive stripe; the Y– stripe selection switch and the Y– stripe selection switch of the second resistive stripe contacting the first resistive stripe are closed, and the other switches are all opened;
   a Y+capacitor charging time measuring unit which obtains a charge time taken until a charging level given as $V_C/V_{DD}$ reaches a desired level when a voltage measured by the Y+ capacitor voltage detection unit is $V_C$;
   a Y– capacitor charging time measuring unit which obtains a charge time taken until a charging level given as $V_C/V_{DD}$ reaches a desired level when a voltage measured by the Y– capacitor voltage detection unit is $V_C$;
   a Y+ equal resistance line operating unit which obtains an equal resistance line based on a value of $(R_V+R_{Y+})$ using $V_C/V_{DD}=1-e^{-t/((R_V+R_{Y+})YC_{conR})}$, where the contacting first resistive stripe has resistance $R_V$, the contacting second resistive stripe has resistance $R_{Y+}$, and t is charge time of the Y+ capacitor $C_{conR}$ obtained by the Y+ capacitor charging time measuring unit;

a Y− equal resistance line operating unit which obtains an equal resistance line based on a value of $(R_V+R_{Y-})$ using $V_C/V_{DD}=1-e^{-t/((R_V+R_{Y-})\cdot C_{conL})}$, where the contacting first resistive stripe has resistance $R_V$, the contacting second resistive stripe has resistance $R_{Y-}$, and t is charge time of the Y− capacitor $C_{conL}$ obtained by the Y− capacitor charging time measuring unit; and a touch coordinate calculating unit which searches for a point of intersection between the equal resistance line based on the value of $(R_V+R_{Y+})$ and the equal resistance line based on the value of $(R_V+R_{Y-})$.

2. The multi-touch recognition resistive touchscreen of claim 1, wherein the Y+ capacitor charging time measuring unit and the Y− capacitor charging time measuring unit obtain the charge time when the charging level $V_C/V_{DD}$ is 0.632.

3. The multi-touch recognition resistive touchscreen of claim 1, further comprising a discharge unit with a discharge switch for discharging the voltage charged in the Y+ and Y− capacitors between the Y+ capacitor voltage detection unit and the Y+ capacitor and between the Y− capacitor voltage detection unit and the Y− capacitor.

4. The multi-touch recognition resistive touchscreen of claim 1, wherein a plurality of Y+ equal resistance line switches is provided and alternately operated, each of the Y+ equal resistance line switches being disposed between the common capacitor and the Y+ stripe selection switch to determine whether the common capacitor is connected to the plurality of Y+ stripe selection switches.

5. The multi-touch recognition resistive touchscreen of claim 1, wherein a plurality of Y− equal resistance line switches is provided and alternately operated, each of the Y− equal resistance line switches being disposed between the common capacitor and the Y− stripe selection switch to determine whether the common capacitor is connected to the plurality of Y− stripe selection switches.

6. The multi-touch recognition resistive touchscreen of claim 2, wherein a plurality of Y+ equal resistance line switches is provided and alternately operated, each of the Y+ equal resistance line switches being disposed between the common capacitor and the Y+ stripe selection switch to determine whether the common capacitor is connected to the plurality of Y+ stripe selection switches.

7. The multi-touch recognition resistive touchscreen of claim 3, wherein a plurality of Y+ equal resistance line switches is provided and alternately operated, each of the Y+ equal resistance line switches being disposed between the common capacitor and the Y+ stripe selection switch to determine whether the common capacitor is connected to the plurality of Y+ stripe selection switches.

8. The multi-touch recognition resistive touchscreen of claim 2, wherein a plurality of Y− equal resistance line switches is provided and alternately operated, each of the Y− equal resistance line switches being disposed between the common capacitor and the Y− stripe selection switch to determine whether the common capacitor is connected to the plurality of Y− stripe selection switches.

9. The multi-touch recognition resistive touchscreen of claim 3, wherein a plurality of Y− equal resistance line switches is provided and alternately operated, each of the Y− equal resistance line switches being disposed between the common capacitor and the Y− stripe selection switch to determine whether the common capacitor is connected to the plurality of Y− stripe selection switches.

* * * * *